(12) United States Patent
Earhart et al.

(10) Patent No.: US 11,796,827 B1
(45) Date of Patent: Oct. 24, 2023

(54) SYSTEMS AND METHODS FOR NOISE REDUCTIONS IN LIDAR SENSING OF A TARGET BY WAVELENGTH TOGGLING AND FILTERING

(71) Applicant: Ball Aerospace & Technologies Corp., Boulder, CO (US)

(72) Inventors: Ronald P. Earhart, Arvada, CO (US); Kevin L. Whiteaker, Erie, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 732 days.

(21) Appl. No.: 16/806,903

(22) Filed: Mar. 2, 2020

Related U.S. Application Data

(60) Provisional application No. 62/812,434, filed on Mar. 1, 2019.

(51) Int. Cl.
*G01S 7/481* (2006.01)
*G01S 17/88* (2006.01)
*G02B 27/14* (2006.01)
*G01J 3/02* (2006.01)
*G01B 11/02* (2006.01)
*G01C 3/00* (2006.01)
(Continued)

(52) U.S. Cl.
CPC .......... *G02B 27/141* (2013.01); *G01J 3/0229* (2013.01); *G01S 7/4816* (2013.01); *G01B 11/022* (2013.01); *G01C 3/00* (2013.01); *G01C 3/08* (2013.01); *G01S 17/88* (2013.01); *G01S 17/89* (2013.01)

(58) Field of Classification Search
CPC . G02B 27/141; G02B 27/1006; G01J 3/0229; G01S 7/4816; G01S 17/88; G01S 17/89; G01B 11/022; G01C 3/00; G01C 3/08; H04B 10/503
See application file for complete search history.

(56) References Cited

U.S. PATENT DOCUMENTS 7,046,928 B1    5/2006    Bradford et al.
8,184,270 B1 *  5/2012    Billmers .................. G01S 17/89
                                                    356/3.01
(Continued)

OTHER PUBLICATIONS

U.S. Appl. No. 17/871,748, filed Jul. 22, 2022, Earhart et al.
(Continued)

*Primary Examiner* — Yuqing Xiao
*Assistant Examiner* — Zhengqing Qi
(74) *Attorney, Agent, or Firm* — SHERIDAN ROSS

(57) ABSTRACT

A Lidar system is provided. The Lidar system includes a laser emitter transmitting a first signal of a first wavelength. The Lidar system includes a filter receiving the first signal. The Lidar system includes a first dichroic filter switch filtering the first signal received by the variable waveplate or other filter. The Lidar system includes a receiver sensor receiving the filtered first signal. The Lidar system includes the laser emitter transmitting a second signal of a second wavelength. The Lidar system includes the variable waveplate or other filter receiving the second signal. The Lidar system includes the first dichroic filter switch filtering the second signal. The Lidar system includes the receiver sensor receiving the filtered second signal. A processor determines a distance of a target based on the received filtered first and second signals.

22 Claims, 6 Drawing Sheets

(51) Int. Cl.
*G01C 3/08* (2006.01)
*G01S 17/89* (2020.01)

(56) References Cited

U.S. PATENT DOCUMENTS

| | | | | |
|---|---|---|---|---|
| 9,645,291 | B1* | 5/2017 | Sommer | G01J 3/4406 |
| 10,841,007 | B1 | 11/2020 | Carlson | |
| 10,845,480 | B1* | 11/2020 | Shah | H01S 5/50 |
| 2007/0221849 | A1* | 9/2007 | Tabirian | G01S 17/18 |
| | | | | 250/341.1 |
| 2009/0122295 | A1* | 5/2009 | Eaton | G01C 11/025 |
| | | | | 342/357.31 |
| 2009/0214221 | A1 | 8/2009 | Li et al. | |
| 2018/0284228 | A1* | 10/2018 | LaChapelle | G01S 17/42 |
| 2019/0079171 | A1* | 3/2019 | Hwang | G01S 7/4814 |
| 2019/0346537 | A1* | 11/2019 | Krelboim | G01S 17/931 |

OTHER PUBLICATIONS

Havermeyer et al., "Miniature Self-Aligned External Cavity Tunable Single Frequency Laser for THz Generation," Proceedings of the Society of Photo-Optical Instrumentation Engineers, vol. 8261, 2012, 7 pages.

North et al., "Analysis of Self-Pulsating Sources Based on Cascaded Regeneration and Soliton Self-Frequency Shifting," IEEE Journal of Selected Topics in Quantum Electronics, vol. 20, No. 5, Sep. 2014, 7 pages.

Official Action for U.S. Appl. No. 17/871,748, dated Dec. 19, 2022, 18 pages.

Official Action for U.S. Appl. No. 17/871,748, dated Apr. 12, 2023, 11 pages.

* cited by examiner

SYSTEMS AND METHODS FOR NOISE REDUCTIONS IN LIDAR SENSING OF A TARGET BY WAVELENGTH TOGGLING AND FILTERING

CROSS REFERENCE TO RELATED APPLICATION

The present application claims the benefits of and priority, under 35 U.S.C. § 119(e), to U.S. Provisional Application Ser. No. 62/812,434, filed Mar. 1, 2019, entitled "SYSTEMS AND METHODS FOR NOISE REDUCTIONS IN LIDAR SENSING OF A TARGET BY WAVELENGTH TOGGLING AND FILTERING," which is incorporated herein by this reference in its entirety for all that it teaches and for all purposes.

FIELD

The present disclosure is generally directed to a laser system and more particularly to a Lidar system capable of mitigating backscatter.

SUMMARY

Lidar (also called LIDAR, LiDAR, and LADAR) is a method of measuring a distance to a target by emitting laser light toward the target and measuring the reflected laser light with a receiver or other sensor. The amount of time the laser light takes to reach the receiver as reflected laser light can then be used to determine a distance to the target, make digital 3-D representations of the target, or to determine other information relating to the target. Lidar systems have terrestrial, airborne, mobile, and other applications.

The performance of a Lidar system is typically strongly related to the signal-to-noise ratio ("SNR") of the system. This is especially true in Geiger Mode ("GM") Photon Counting ("PC") Lidar systems where background noise signals can blind the system from the actual target signal. Such background noise signals are typically dominated by backscattering of light from a backscattering medium, such as shared optics or particulates, at closer ranges than the target. As the range from the target to the backscattering medium reduces, the amplitude of the noise increases dramatically. While newer Lidar sensors may have significantly higher frame rates, and such sensors have the potential to provide significant performance improvements, higher frames rates can result in a reduction in the backscattering range, and therefore, an increase in the amplitude of the noise. To take full advantage of new sensors with high frame rates, an efficient and effective approach to backscatter mitigation is needed.

Some contemporary Lidar systems delay the time between a laser pulse and an integration gate to minimize how much backscatter was collected by the sensor. Such systems result in lower frame rates for the camera and longer integration times. A major drawback of lowering the pulse repetition frequency ("PRF"), is a reduction in the data collection rate. This limitation eliminates any advantage of higher frame rate cameras. This limitation also reduces any advantages of running the laser at higher PRF.

Lasers used for Lidar applications are typically more efficient at higher PRF, meaning that the lasers have a higher efficiency per datapoint collected. In addition, these lasers tend to be peak power (energy per pulse) limited, but not average power (energy per pulse*PRF) limited. Thus, a higher PRF can allow for the integration of more pulses in a single time period, which can have the effect of increasing the integrated SNR.

Contemporary systems may use a burst waveform to mitigate backscatter. For example, a burst waveform may consist of a lower macro pulse rate of fire (PRF) laser, with each macro pulse consisting of a burst of pulses (micro pulses). The low frequency of the macro pulse provides greater distance between pulses and can reduce system backscatter. The micro pulses allow for several low power pulses which can provide multiple detection events, increasing the SNR of a given time period. However, this approach does not work with high frame rate cameras and requires streaming sensors which are less common and more difficult to process due to time scale. Burst lasers are also more complicated and less efficient due to the major variation in the thermal environment and increase in peak power or peak pumping.

Some contemporary systems reduce the PRF so that the backscatter does not blind the receiver when the expected target reflections are being received. These contemporary systems operate in a type of burst mode. These systems are overall generally complicated, and the laser has to produce burst mode which pushes the laser away from a near continuous operation. This reduces the laser efficiency and requires higher peak power lasers to provide the same detection range. This higher power also reduces the kinds of laser that can be used and increase the challenges with optical coatings.

Some systems attempt to leverage polarization to reduce the signal level, but depolarization from scattering reduces the effectiveness as there is still a significant level of backscatter relative to single photon counting systems.

DETAILED DESCRIPTION

Figure 1:
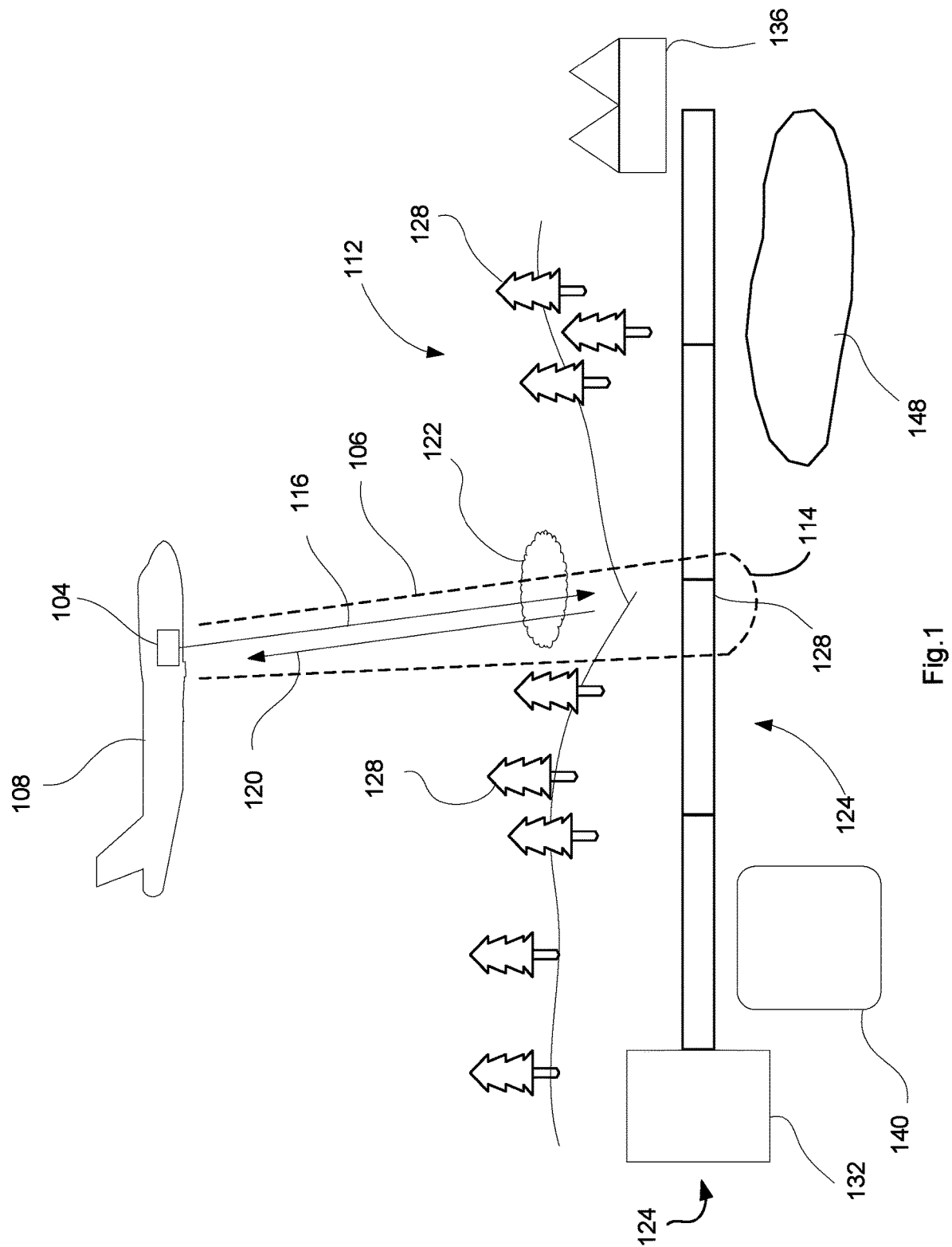
FIG. 1 depicts a system incorporating a Lidar system for detecting a position of a target from a plane in accordance with embodiments of the present disclosure.

What is needed is a system capable of increasing the SNR and the range reach of a Lidar system. As described herein, a unique and novel system may be provided to greatly increase the range reach of a Lidar system by filtering dominate noise source through spectral toggling. Also, disclosed systems can utilize simple and high-PRF lasers with lower peak power than are required by burst waveform lidar systems. Embodiments as described herein may use a high-power fiber laser which is typically 2-4 times more efficient than a solid-state laser, greatly reducing the size, weight and power (SWAP) of a lidar system. A fiber front end does not preclude the ability to use a solid state amplifier when peak power is required. In some embodiments, a planar wave guide laser amplifier may be used. As described herein, a planar wave guide laser amplifier may be a hybrid solid state/fiber laser in one dimension. While description of the systems and methods herein may be described in relation to one particular type of laser system, such as a fiber laser, it should be appreciated that the same or similar methods and systems may be implemented using any type of laser system.

In some embodiments of the systems described herein, wavelength toggling of two or more wavelengths may be used in the transmit and receive paths of a Lidar system so that close range backscattered light and target reflected light are received by a sensor at different wavelengths. A high-speed switch on the receive side or a spectral/spatial separating optics can then filter out the close range backscatter light and collect only the long range target light. A graphical description, representing an example implementation, is described below. This approach looks like a wavelength-based time gate allowing the system to look at the light from any specific range while ignoring the noise from another range gate. Thus, it could also be used to ignore any noise at a given range relative to the target (before or behind). However, for most applications the noise is in the foreground. In some embodiments, a laser system may switch between emitting light of a first wavelength and emitting light of a second wavelength. In some embodiments, a laser system may switch between emitting light of a first band of wavelengths and emitting light of a second band of wavelengths. It should be appreciated that in the description herein any one wavelength may be replaced by light of a band of wavelengths as opposed to a single wavelength. For example, a laser system may be configured to dump several laser lines around a 1 nanometer band instead of using a laser at a single wavelength.

Wavelength Toggling also provides significant advantages to for self-protection capability to a Lidar system with photon counting camera. A major challenge is Lidar system is they have been easily damaged or destroyed by optical over illumination arising from optical backscatter from the "outgoing" laser pulse or overpowering reflected pulses due to retroreflectors in the field of view. Wavelength toggling provides a way to eliminate that backscatter an outgoing laser pulse from reaching the sensor. The high PRF laser also allows for significantly (10 to 1000×) lower peak power pulses. These lower peak power pulses reduce the peak power of a retroreflected laser pulse greatly and reduces the change for damage in an operational application. Thus wavelength toggle provides for a robust way to protect the camera from damage, increasing it applicability.

As described herein, a Lidar system may be designed in such a way that greatly reduces the requisite size, weight and power (SWAP) of a lidar system by enabling the use of a simple and high PRF laser with lower peak power than required by traditional or burst lidar systems. Laser size, thermal handling is also reduced significantly, which increase overall reliability. The low peak power laser pulse also reduces requirements on window/optical coatings, providing for much higher reliability system.

Embodiments of the Lidar system described herein incorporate multicolored lasers that toggle between wavelengths or wavelength bands at a much lower frequency than the fundamental PRF of an integrated Lidar. The wavelength separation between the bands may be of a sufficient wavelength to allow for the filtering on the receive optics and detector. The temporal frequency at which the wavelengths toggle may be sufficient to push the distance of the in-band backscattering noise further out.

In some embodiments, the wavelengths bands used in the toggle may be comprised of multiple lasers which are combined to produce a small spectral band relative to a spectral toggling separation amount.

The receive optics may incorporate a demultiplexing method to separate the different spectral signals from known noise ranges (e.g., close range backscatter) and desired range locations (e.g., range with target). This may be executed through the use of spectral filters and some periodically blocking elements (e.g., chopper, Pockels cell, acousto-optic modulator ("AOM"), etc.) or through spatial separation on the focal plane (Grading, etc.). While the disclosure describes specific switching architectures, it should be appreciated that other switching architectures are possible.

The transmission optical path of the Lidar systems described herein may include a multiplexing output to produce a wavelength toggling code and/or to reduce in band amplified spontaneous emission (ASE) light leakage as associated with many laser systems.

One potential application for Lidar systems is in connection with detecting a distance between the Lidar system and a target. As noted, air between the target and the Lidar system may include particles or other substances which may create noise in the signal. These substances can create a backscattering of the laser light emitted by the Lidar system and may lower the accuracy of any measurements generated by the Lidar system. Accordingly, mitigating such backscatter is of great interest. However, Lidar systems capable of mitigating backscatter while still being efficient in terms of size, weight, and power have been unavailable. In particular, a system that was of a reasonably small size, low weigh, required low power and that provided suitable backscatter mitigation has been unavailable.

As described herein, Lidar systems and methods of using a Lidar system capable of providing self-protection to over-illumination may be created. Many contemporary Lidar systems have been damaged, for example by a cascade or fusing event where the whole sensor array is damage, not just individual pixels, by optical backscattering when the laser fires. The present disclosure provides systems capable of self-protecting from over-illumination which may help mitigate optical backscattering when the laser fires.

Embodiments of the present disclosure provide a Lidar system capable of mitigating backscatter noise generated both in front of and behind a target. A Lidar system as described herein may use wavelength toggling to toggle between two or more wavelengths in the transmit and receive path of the Lidar system. In this way, backscattered light and light reflected off the target may be received by the sensor in different wavelengths.

Embodiments of the present disclosure make use of spectral toggling to filter noise created by a dominant noise source from a signal. A high speed switch on the receive side of the Lidar system may filter out backscatter light and collect only the target light.

Embodiments of the present disclosure are characterized by:
1. includes two or more laser seed diodes, each emitting lasers of different wavelengths, a wavelength filter switch to switch between each of the lasers, and a fiber laser amplifier to amplify the laser emitted from the wavelength filter switch;
2. makes use of a wavelength filter switch at the receive side of the Lidar system to filter out received light at an unexpected wavelength;
3. provides an increased range reach of the Lidar system by filtering out noise from a dominate noise source;

4. utilizes simple and high PRF lasers with lower peak power than required by burst;
5. Uses spectral toggling to provide improved self-protection from optical over illumination; and
6. provides improved weight, size, and power as compared to conventional Lidar systems.

Additional features and advantages of embodiments of the disclosed systems and methods will become more readily apparent from the following description, particularly when taken together with the accompanying drawings.

A remote sensor system or a light detection and ranging (LIDAR) system 104 in accordance with embodiments of the present invention, in an exemplary operating environment, is depicted in FIG. 1. The LIDAR system 104, also referred to herein as a sensor system 104, is mounted to a platform 108. In this example, the platform 108 is an airplane, however, other mobile or even stationary platforms 108 may be associated with the LIDAR system 104. Examples of other mobile platforms 108 include satellites, helicopters, unmanned aerial vehicles, autonomous rovers, balloons, cars, all-terrain vehicles, ships or other mobile platforms. Examples of stationary platforms 108 include radio towers, power transmission towers, observation towers, telephone poles, or other stationery supports. In general, the platform 108 is used to place the sensor system 104 in a location from which a survey area, target region, or scene 112 is observed. When the sensor system 104 is in a desired position with respect to the scene 112, it is operated to output illumination light 116 and pass the light through a target volume 106 to illuminate a target area or areas 114 within the scene 112. Reflected light 120 is returned from the target area 114 with the scene 112 and is detected by the LIDAR or sensor system 104.

As can be appreciated by one of skill in the art after consideration of the present disclosure, different target areas 114 comprising different elements or features within a scene 112 will reflect the illumination light 116 differently. For example, a terrain feature comprising a forested hillside 128 may reflect the illumination light 116 less efficiently than a lake or pond 148. As a further example, an area within the scene 112 covered by snow will typically reflect the illumination light 116 more efficiently than an area that is not covered by snow.

Accordingly, as an example but without limitation, embodiments of the present disclosure can operate to mitigate backscatter light created by noise in the atmosphere between the Lidar system and the target. In some embodiments, backscatter light may be created by noise further from the Lidar system than the target.

Figure 2A:
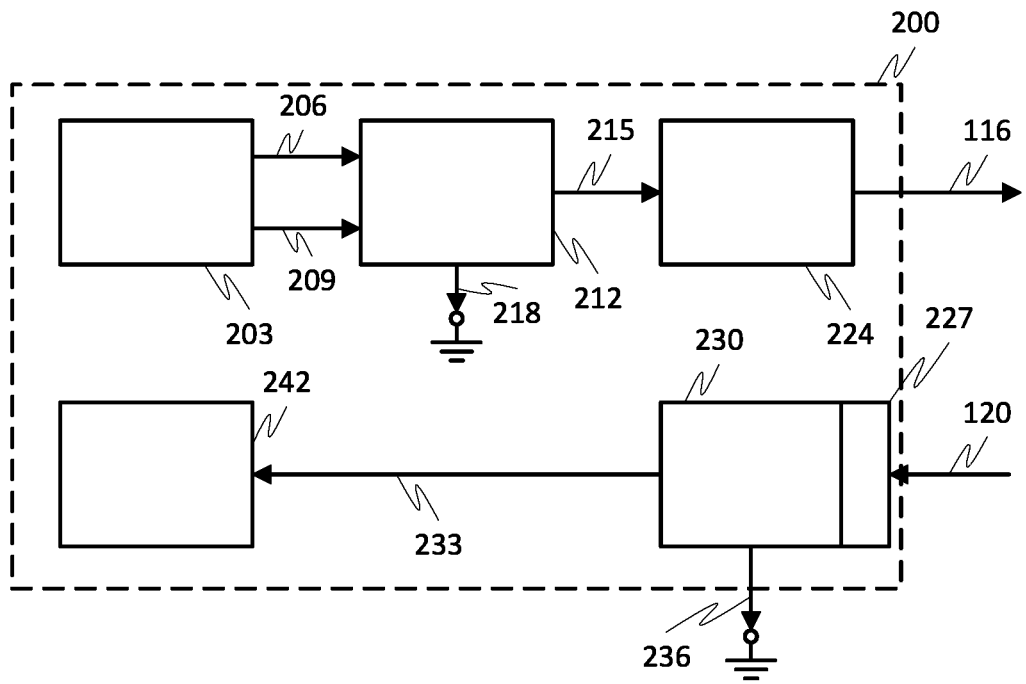
FIG. 2A depicts a Lidar system in accordance with embodiments of the present disclosure.

FIG. 2A illustrates components that may be included in a Lidar system 200 in some embodiments. For example, the Lidar system 200 may comprise a laser emitter 203. The laser emitter 203 may be capable of emitting multiple lasers of multiple wavelengths. For example, a Lidar system 200 may comprise two laser seed diodes. A first laser 206 of a first wavelength may be emitted from the laser emitter 203 and a second laser 209 of a second wavelength may be emitted from the laser emitter 203.

The lasers 206, 209 emitted from the laser emitter 203 may be fed through a wavelength filter switch 212 which may be as described in greater detail below. The wavelength filter switch 212 may be capable of eliminating or otherwise grounding out a first laser 218 of the two input lasers 206, 209 and transmitting a second laser 215 of the two input lasers 206, 209 to an amplifier 224 such as a fiber laser amplifier.

The wavelength filter switch 212 may be capable of quickly switching between outputting a first of the two input lasers 206, 209 and outputting a second of the two input lasers 206, 209. The output laser 215 of the wavelength filter switch may pass through the amplifier 224 and be output of the Lidar system 200 as an emitted beam 116. By switching the output of the wavelength filter switch 212 between the two input lasers 206, 209, the laser 116 output from the Lidar system 200 may switch between wavelengths equivalent to the first and second input lasers 206, 209. In some embodiments, the wavelength filter switch may comprise a dichroic and/or temporal switch. In some embodiments, the wavelength filter switch may comprise a spectral-spatial filter such as a grating that spatially separates or demuxes the incoming signals.

The Lidar system 200 may further comprise a variable waveplate 227 capable of detecting incoming light 120. For example, the variable waveplate 227 may receive returning laser light as bounced off of a target a distance away from the variable waveplate 227. The variable waveplate 227 may also receive any backscatter light created by noise in the atmosphere. While a variable waveplate 227 is described herein by way of example, the disclosure should not be considered as limited to such. For example, received signal colors may be separated out using a grating to spatially separate out the colors and to illuminate a different part of the array. Polarization, as performed by a variable waveplate, is only one way to separate out wavelengths and/or colors of light. The systems and methods described in the present disclosure should not be considered as limited to polarization or any other system of filtering wavelengths and/or colors.

Light received by the variable waveplate 227 may be fed into a second wavelength filter switch 230. The second wavelength filter switch 230 may be capable of filtering out light of an expected wavelength, outputting the received light of the expected wavelength 233 to a receiver 242 and eliminating, ignoring, or grounding out any other received light 236.

Figure 2B:
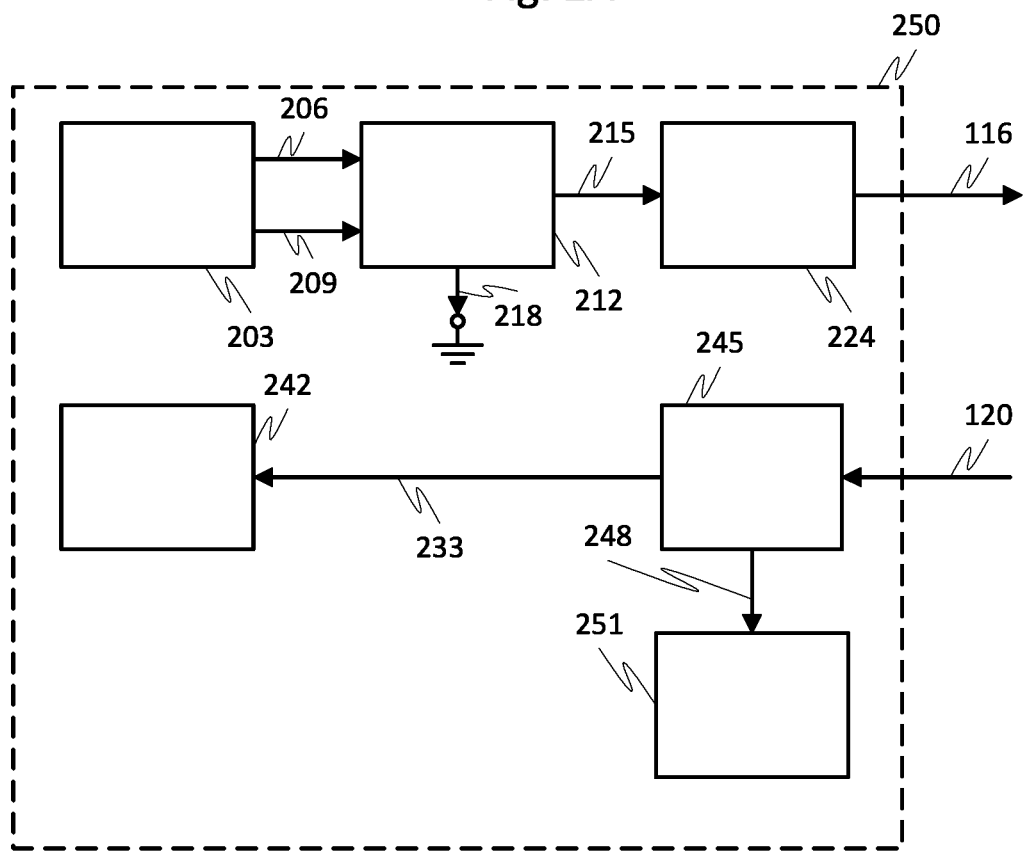
FIG. 2B depicts a Lidar system in accordance with embodiments of the present disclosure.

As illustrated in FIG. 2B, a Lidar system 250 may in some embodiments comprise a spectral-spatial demultiplexer ("demux") element 245 such as a grating or dichroic filter. The spectral-spatial demux element 245 may be capable of splitting the incoming light 120 into a first output laser 233 and a second output laser 248. Each of the first output laser 233 and the second output laser 248 may be received by a different receiver 242, 251. As can be appreciated, the incoming light 120 may be split into one, two, or any number of spectral-spatial signals of various ranges of wavelengths. Using a Lidar system 250 as illustrated in FIG. 2B, both the first output laser 233 and the second output laser 248 may be analyzed together or separately to determine the distance to the target.

Figure 3:
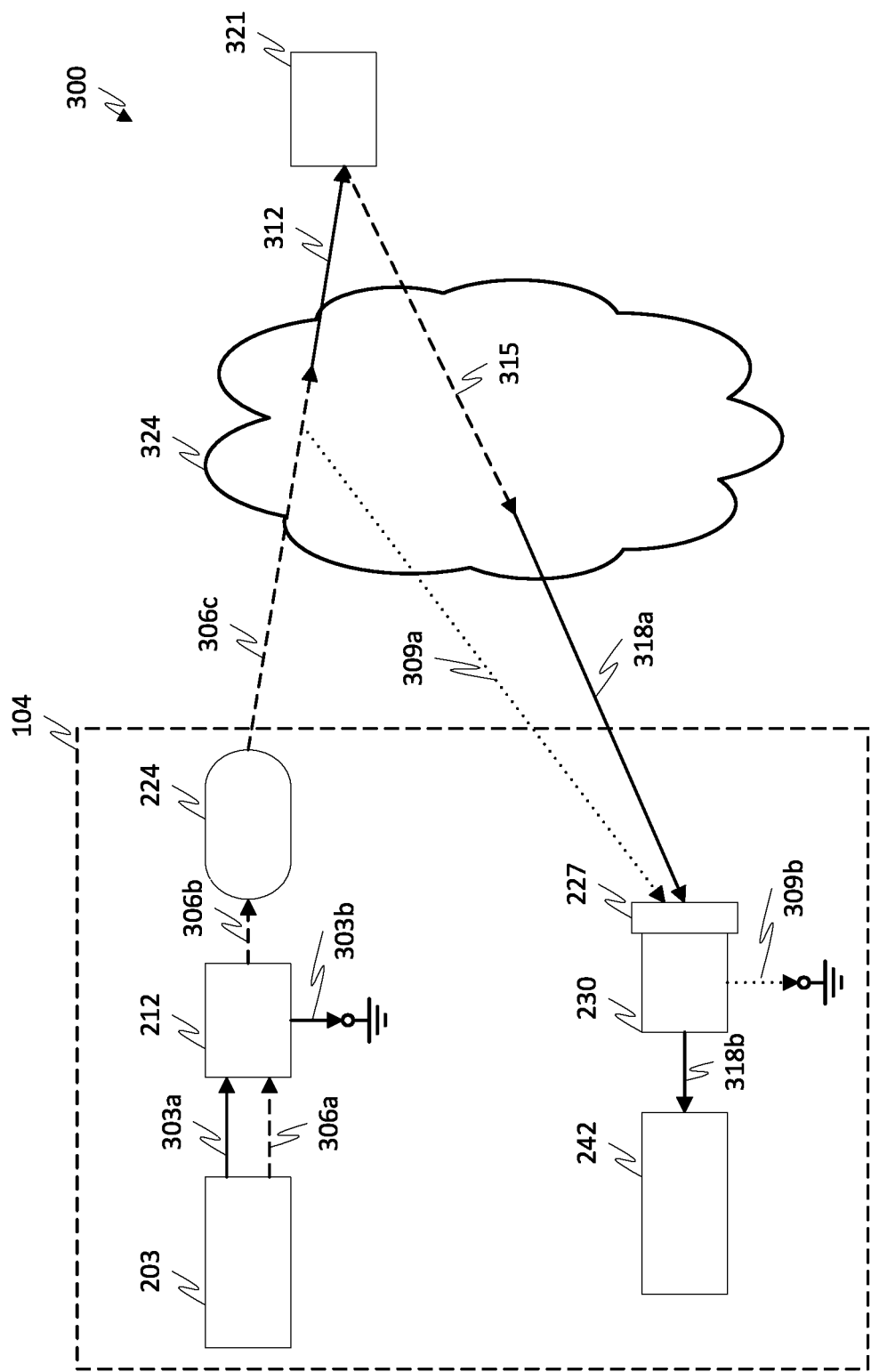
FIG. 3 depicts a Lidar system detecting a position of a target in accordance with embodiments of the present disclosure.

FIG. 3 depicts an environment 300 illustrating a Lidar system 104 in accordance with one or more embodiments as described herein. As previously described, the Lidar system 104 may comprise an emitter 203 emitting two lasers 303a, 306a. Each of the two emitted lasers 303a, 306a may be of a different wavelength. A wavelength filter switch 212 may operate to output one laser 306b of the two emitted lasers 303a, 306a, and to eliminate, ignore, or ground out the other laser 303b of the two emitted lasers 303b, 306b. The wavelength filter switch 212 may switch between outputting a laser 306b with a wavelength equivalent to the first laser 303a and outputting a laser with a wavelength equivalent to the second laser 306a. The laser 306b output by the first wavelength filter switch 212 may be amplified by an amplifier 224 and may be output as an output laser 306c toward a target 321. While the Lidar system 104 described in accordance with FIG. 3 is similar to the Lidar system 200 illustrated in FIG. 2A, it should be appreciated such a system may be executed using a system such as the Lidar system 250 illustrated in FIG. 2B and described herein.

As depicted in FIG. 3, the laser emitted from the Lidar system 104 may be periodically switched between a first wavelength and a second wavelength as illustrated by the dashed and solid lines of 306c, 312, 315, 318a. The depiction in FIG. 3 shows a snapshot in time after which the Lidar system 104 emitted a first laser 318a of a first wavelength, a first laser 315 of a second wavelength, a second laser 312 of the first wavelength, and a second laser 306c of the second wavelength. Thus, at any given time lasers emitted from the Lidar system 104 may be of two different wavelengths between the Lidar system and the target.

As laser light travels from the Lidar system 104 and the target 321, the laser light may travel through air containing a noise source 324. A noise source 324 may reflect a portion 309a of a laser 306c emitted from the Lidar system 104. The portion 309a of the laser 306c may be received by a variable waveplate 227 of the Lidar system 104 in addition to a laser 318a returning from the target 321.

After being received by the variable waveplate 227, the laser 318a returning from the target 321 and the portion 309a reflected by the noise source 324 may enter a second wavelength filter switch 230. The wavelength filter switch 230 may operate to pass an output laser 318b which is equivalent to the laser 318a returning from the target 321 by filtering out the portion 309a reflected by the noise source 324 based on the wavelength of the laser 318a returning from the target 321. The portion 309a reflected by the noise source 324 may be eliminated, ignored, or otherwise grounded out, while the output laser 318b which is equivalent to the laser 318a returning from the target 321 may be received by a receiver sensor 242 of the Lidar system 104.

Figure 4A:
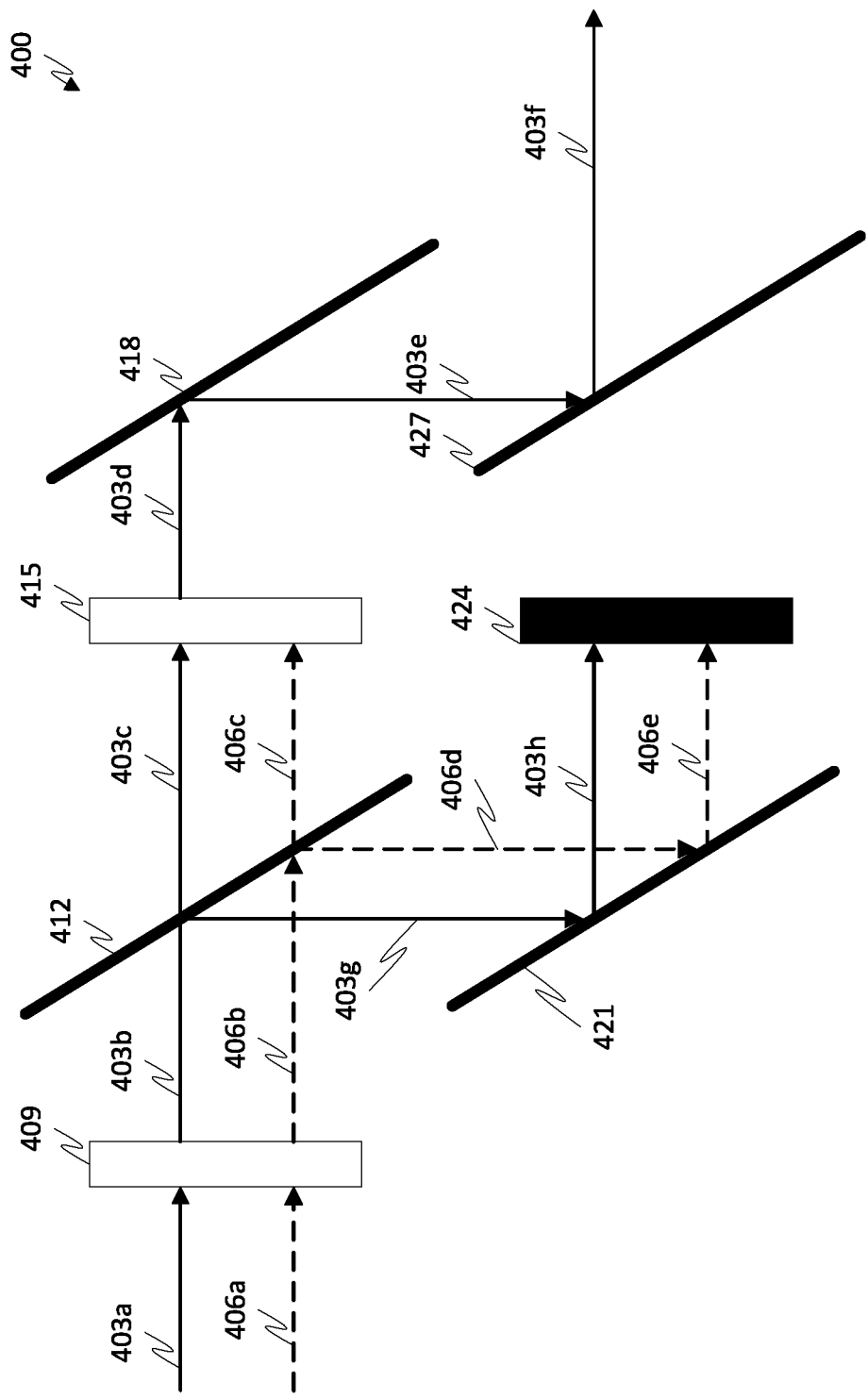
FIG. 4A is a depiction of a switch in accordance with embodiments of the present disclosure.
Figure 4B:
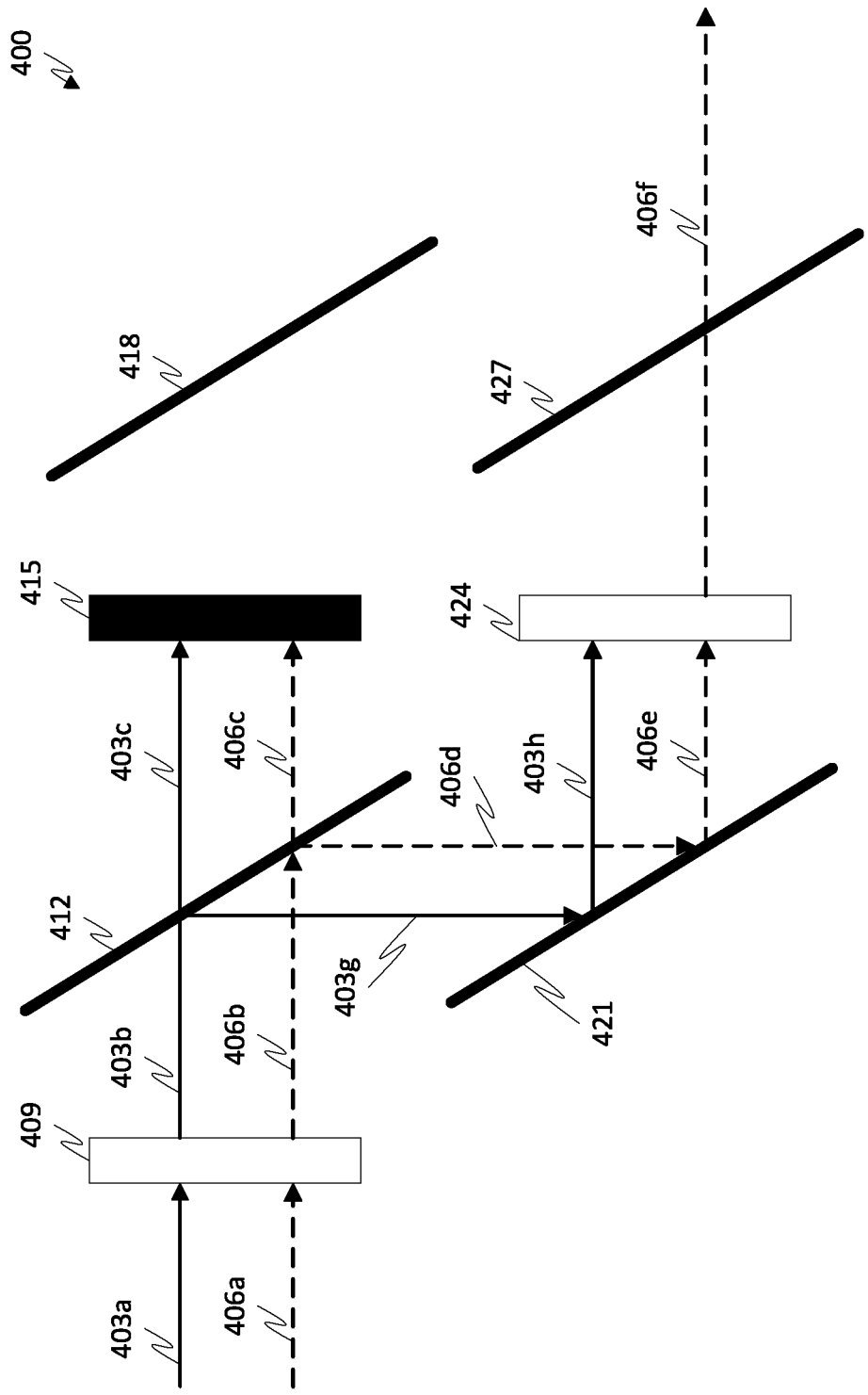
FIG. 4B is a depiction of a switch in accordance with embodiments of the present disclosure.

The wavelength filter switches 212, 230 of the Lidar system 104 may be a dichroic filter switch as depicted in FIGS. 4A and 4B. FIG. 4A depicts a dichroic filter switch 400 in a first state emitting a laser 403f with a first wavelength matching a wavelength of a first input laser 403a and FIG. 4B depicts the dichroic filter switch 400 in a second state emitting a laser 406f with a second wavelength matching a wavelength of a second input laser 406a. The dichroic filter switch 400 may comprise four polarizing beam splitters 412, 418, 421, 427 or other reflective surfaces which both allow lasers to pass through and reflect off at an angle. The dichroic filter switch 400 may also comprise a variable wave plate 409 and two or more narrow band-pass filters 415, 424.

The variable wave plate 409 may be capable of receiving two or more lasers 403a, 406a. The received lasers 403a, 406a may be of different wavelengths. For example, a first laser 403a received by the variable wave plate 409 may be of a first wavelength and a second laser 406a received by the variable wave plate 409 may be of a second wavelength. The two lasers 403a, 406a may be received by the variable wave plate 409 simultaneously. The variable wave plate 409 may pass the two received lasers 403a, 406a out as two output lasers 403b, 406b. For example, the first input laser 403a may be output as a first internal laser 403b where the first input laser 403a has a same wavelength as the first internal laser 403b, while the second input laser 406a may be output as a second internal laser 406b where the second input laser 406a has a same wavelength as the second internal laser 406b.

Upon the internal lasers 403b, 406b reaching a first polarizing beam splitter 412 the internal lasers 403b, 406b may be split. For example, 403b may be split into a first beam 403c traveling through the first polarizing beam splitter 412 and in the same general direction as the first internal laser 403b and a second beam 403g traveling at a ninety-degree angle from the first internal laser 403b. Similarly, the second internal laser 406b may be split into a first beam 406c traveling through the first polarizing beam splitter 412 and in the same general direction as the second internal laser 406b and a second beam 406d traveling at a ninety degree angle from the second internal laser 406b.

For the two beams 403c, 406c traveling through the first polarizing beam splitter 412, the beams 403c, 406c may be filtered using a first narrow bandpass filter 415.

As seen in FIGS. 4A and 4B, each narrow bandpass filter 415, 424 may be turned off and on such that the switch 400 may operate in two states. In a first state as illustrated in FIG. 4A, a first output beam 403f of a same wavelength as a first input beam 403a of the two input beams 403a, 406a may be outputted while in a second state as illustrated in FIG. 4B, a second output beam 406f of a same wavelength as a second input beam 406a of the two input beams 403a, 406a may be outputted.

In the first state as illustrated in FIG. 4A, the filter 415 may be turned on such that a first beam 403c of the two beams 403c, 406c passes through the filter 415 as beam 403d while a second beam 406c of the two beams 403c, 406c ends at the filter 415. The beam 403d may then reflect as a beam 403e off a second polarizing beam splitter 418 and reflect as a beam 403f off a third polarizing beam splitter 427 before being output as a first output beam 403f.

For the beams 403g, 406d reflected off the first polarizing beam splitter 412, each may be reflected off another polarizing beam splitter 421 as beams 403h, 406e. In the first state as illustrated in FIG. 4A, a second narrow bandpass filter 424 may be turned off such that both beams 403h, 406e end at the filter 424 and none pass through.

In the second state as illustrated in FIG. 4B, the first filter 415 may be turned off such that beams 403c, 406c hitting the filter 415 end and the second filter 424 may be turned on such that the beam 403h of the first wavelength ends at the second filter 424 while the beam 406e of the second wavelength pass through the second filter 424 as beam 406f. The beam 406f may pass straight through the third polarizing beam splitter 427 and be output of the switch 400.

Figure 5:
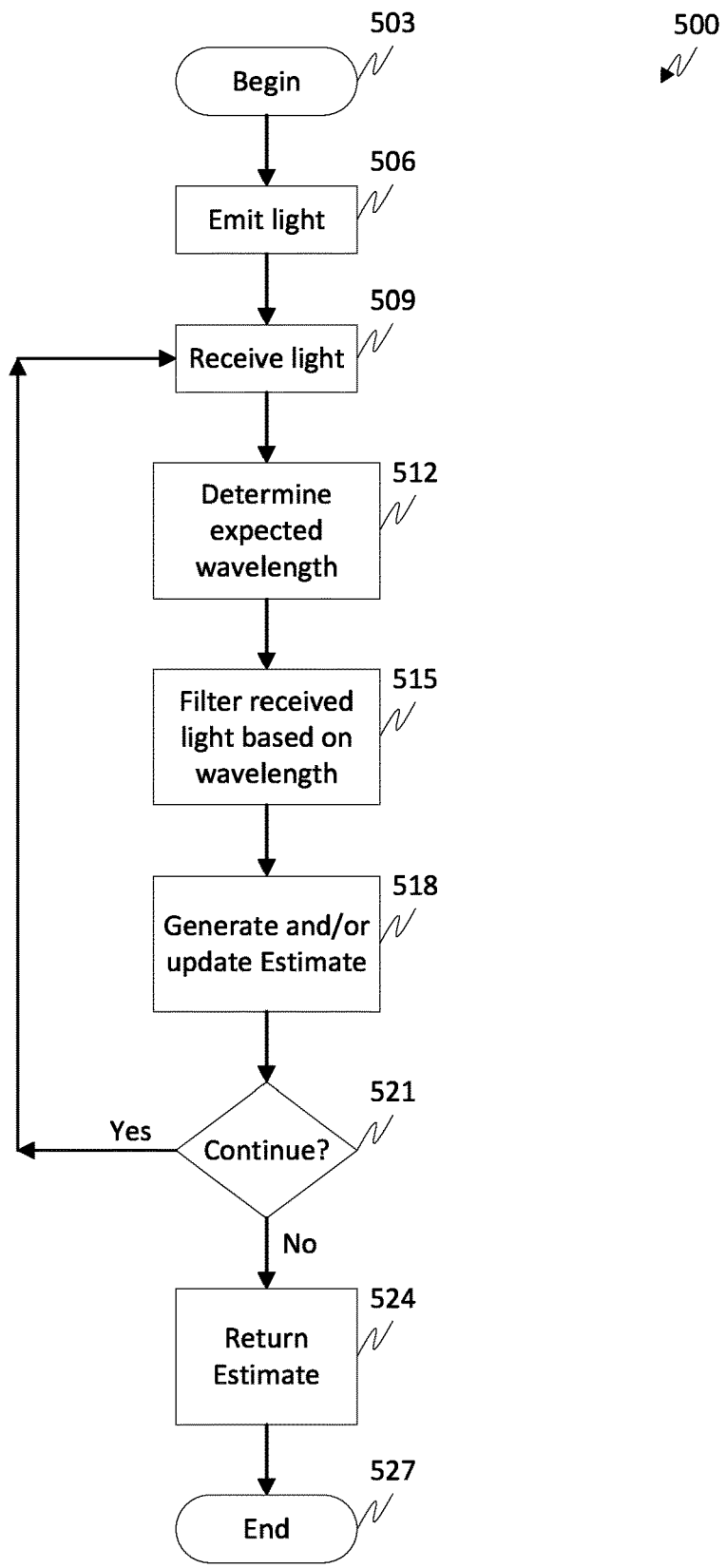
FIG. 5 is a flowchart of a method in accordance with embodiments of the present disclosure.

As illustrated by the flowchart in FIG. 5, a method 500 may be performed using a Lidar system as described herein. At the start 503 of the method 500, a user seeking to determine qualities of a target some distance away may have a Lidar system as described above. The user may or may not have an estimated distance between the target and the Lidar system. For example, the user may use the Lidar system to determine a rough estimate of the distance of the target.

In a first step 506 of the method 500, the Lidar system may begin to emit a series of pulses of lasers toward the target. For example, the Lidar system may comprise two laser seed diodes and may constantly generate two lasers, where each laser is of a different wavelength. For example, in some embodiments, the wavelength of a first laser may be in a range of 1540-1550 nm and the wavelength of a second laser may be in a range of 1560-1570 nm. In some embodiments, the wavelengths of the first and second lasers may be different by a factor of 20 nm. A dichroic filter switch as described above may be used to switch between emitting each of the two lasers. However in some embodiments a different type of wavelength switch may be used. A computer system may be used to control the wavelength filter switch. The lasers may each be pulsed for a specific period of time. The period of time each laser is pulsed may be a specific amount and may be determined based on each laser's wavelength, an estimated distance to the target, and/or other factors. For example, each laser may be pulsed between 1 and 50 ns. In some embodiments, a laser of one wavelength may be pulsed multiple times in a row before a laser of a second wavelength may be pulsed. In some embodiments there may be a period of rest between each set of pulses where no laser is emitted.

As the Lidar system emits the laser lights toward the target in succession, the Lidar system may then begin receiving light from the lasers as reflected off the target in step 509. The light received may include some noise. For example, before a laser hits the target, portions of the light of the laser may reflect off a noise source in the air. These portions may also be received by the Lidar system. Because the Lidar system emits successions of lasers of different wavelengths, the light received due to noise may be of a wavelength different from the light being received directly from the target.

In step 512, the Lidar system may determine an expected incoming light wavelength. For example, for each laser pulse emitted by the Lidar system, the Lidar system may estimate a time range for the laser pulse to be received by the Lidar system after reaching and returning from the target. This determination may be made based on the wavelength, the speed of light, and/or the distance to the target. This determination may be calculated by a processor of a computer system of or in communication with the Lidar system.

In step 515, a wavelength filter switch of the Lidar system may be used to filter out only received light of the expected wavelength and ignore or otherwise ground out any received light of an unexpected wavelength.

In step 518, the computer system of or in communication with the Lidar system may be used to generate and/or update an estimate of the distance to the target based on the filtered light received.

At step 521, the method 500 may either continue by returning to step 509 and receiving newly incoming light or may end by proceeding to step 524 and returning the most recently updated estimate of the distance to the target before ending in step 527. If the method 500 is continuing, any updated estimate of the distance to the target may be used to finetune the periods of time each laser is emitted from the Lidar system.

In some embodiments, a secondary, or backscatter, channel may be used to monitor positioning and pointing of a beam. Such a channel may provide advanced beam pointing knowledge as compared to contemporary systems. Scattering of near-field laser line may have a measurable or identifiable centroid. The centroid of the near-field laser line scattering collected by a secondary or backscatter channel may be monitored to enable laser pointing calibration and/or monitoring.

When a Lidar system is moved, a corresponding shift in a centroid of a near-field laser line scattering collected by a secondary or backscatter channel of the Lidar system may be detected. For example, if a Lidar system is moved by 20 microrads, a corresponding shift in a centroid of a near-field laser line scattering collected by a secondary or backscatter channel of the Lidar system may be detected. In some embodiments, the corresponding shift in the centroid may be in a one-to-one relation with the movement of the Lidar system. In some embodiments, a corresponding shift in the centroid may be in another type of relation with the movement of the Lidar system.

Such a laser pointing monitoring system may be used to verify the accuracy of movement controls for a Lidar system or may be used to replace or augment an auto-alignment system. By using a secondary, or backscatter, channel to monitor positioning and pointing of a beam, size, weight, power consumption, cost, and/or complexity of a Lidar system may be reduced.

In some embodiments, a secondary or backscatter channel may be used to monitor alternative volume from a primary channel. While a Lidar system may be focused on a primary volume at a certain distance, a secondary channel may be used to monitor other volumes for scattering. Using a secondary channel to monitor alternative volumes from a primary channel may be useful in estimating atmospheric conditions relative to primary scatter volume. Estimating atmospheric conditions relative to primary scatter volume may provide useful information in regard to environmental conditions such as estimate transmission which may affect data acquired at a primary volume. Monitoring alternative volume with a secondary or backscatter channel may be used in some embodiments to map atmospheric or other types of scattering conditions.

In some embodiments, wavelength toggling may be used to avoid transient effects in lasers. One of the limiting factors in laser design is the non-steady state or transient behavior of lasers. Using conventional laser design, many laser design specifications (e.g., power, pointing stability, etc.) may be met only when the laser has achieved steady state thermal conditions. Achieving steady state thermal conditions using a conventional laser system may take an excessive amount of time, such as multiple minutes. Many systems, however, require "photons on demand" and thus cannot wait for the laser to reach steady state. Instead, the laser may be pulsed on and off without reaching steady state thermal conditions. Such laser systems may suffer from poor power efficiency, pointing stability, and other consequences of failing to operate in a steady state thermal condition.

As disclosed herein, in some embodiments, a laser may constantly output light and thus reach and maintain steady state thermal conditions. A light blocker such as a beam dump may be used to optically switch light from the laser from a blocked condition to an emit condition.

Mechanical systems are capable of handling high laser power and handling switching from a blocked condition to an emit condition. Mechanical systems, however, suffer from slow speeds and low reliability due to moving parts. Slow switching speeds of mechanical systems may also provide additional safety concerns such as emitting unwanted protons.

Non-mechanical beam steering can be fast with a high reliability. Non-mechanical beam steering, however, is often limited to relatively low average and peak power.

Wavelength toggling provides for a passive approach, whereas a designated color can be permanently steered off into a beam dump by a dichroic or bandpass filter while other colors are passed and emitted out of the system. Wavelength may be decided at lower power seed and selected on a per pulse basis making switching relatively fast. In this way, the system may operate full time at a high average and high peak power. Using such wavelength toggling provides improved performance for any system which requires steady state thermal conditions. Also, by using such a system, size, weight, power consumption, cost, and/or complexity of a Lidar system may be reduced In some embodiments, interference between a plurality of Lidar systems may be reduced by operating each Lidar system at different wavelengths. As the systems and methods disclosed herein provide for the possibility of each Lidar system to operate at multiple wavelengths, the ability to isolate signals from each system relative to other systems may be improved. In this way, each system may be more robust as it will be less susceptible to damage or false returns as compared to contemporary solutions.

Embodiments of the present disclosure include a method of mitigating backscatter noise in a Lidar system, the method comprising: transmitting a first signal of a first wavelength from a laser emitter; receiving, at a variable waveplate or other filter, the first signal; filtering, with a first wavelength filter switch, the first signal received by the variable waveplate or other filter; receiving the filtered first signal with a receiver sensor; transmitting a second signal of a second wavelength from the laser emitter; receiving the second signal with the variable waveplate or other filter; filtering the second signal with the first wavelength filter switch; receiving the filtered second signal with the receiver sensor; and based on the received filtered first and second signals, determining a distance of a target.

Aspects of the above method include wherein the first and second signals are transmitted from the laser emitter through a second wavelength filter switch.

Aspects of the above method include wherein the first and second signals are transmitted through a fiber laser amplifier, wherein the first and second signals comprise high-power fiber lasers.

Aspects of the above method include the method further comprising estimating the distance of the target prior to transmitting the first signal.

Aspects of the above method include wherein the first and second signals are transmitted for a first and second period of time, respectively, based on the estimated distance.

Aspects of the above method include wherein filtering the first signal comprises: receiving a backscattered signal of a third wavelength, wherein the third wavelength differs from the first wavelength; and using the first wavelength filter switch to filter out the backscattered signal.

Aspects of the above method include wherein the third wavelength is the same as or similar to the second wavelength.

Aspects of the above method include wherein the first and second signals are generated simultaneously, and a second wavelength filter switch is used to transmit each signal individually.

Aspects of the above method include wherein the first wavelength switch is a dichroic filter switch.

Aspects of the above method include wherein the first wavelength switch is a spectral spatial filter switch.

Embodiments of the present disclosure include a Lidar system, the Lidar system comprising: a laser emitter transmitting a first signal of a first wavelength; a variable waveplate or other filter receiving the first signal; a first wavelength filter switch filtering the first signal received by the variable waveplate or other filter; a receiver sensor receiving the filtered first signal; the laser emitter transmitting a second signal of a second wavelength; the variable waveplate or other filter receiving the second signal; the first wavelength filter switch filtering the second signal; the receiver sensor receiving the filtered second signal; and a processor determining a distance of a target based on the received filtered first and second signals.

Aspects of the above Lidar system include wherein the first and second signals are transmitted from the laser emitter through a second wavelength filter switch.

Aspects of the above Lidar system include wherein the first and second signals are transmitted through a fiber laser amplifier, wherein the first and second signals comprise high-power fiber lasers.

Aspects of the above Lidar system include the Lidar system further comprising estimating the distance of the target prior to transmitting the first signal.

Aspects of the above Lidar system include wherein the first and second signals are transmitted for a first and second period of time, respectively, based on the estimated distance.

Aspects of the above Lidar system include wherein filtering the first signal comprises: receiving a backscattered signal of a third wavelength, wherein the third wavelength differs from the first wavelength; and using the first wavelength filter switch to filter out the backscattered signal.

Aspects of the above Lidar system include wherein the third wavelength is the same as or similar to the second wavelength.

Aspects of the above Lidar system include wherein the first and second signals are generated simultaneously, and a second wavelength filter switch is used to transmit each signal individually.

Aspects of the above Lidar system include wherein the first wavelength switch is a dichroic filter switch.

Aspects of the above Lidar system include wherein the first wavelength switch is a spectral spatial filter switch.

Although embodiments of a Lidar system have been discussed that incorporate a wavelength filter switch to switch between lasers of different wavelengths, other configurations are possible. For example, any Lidar system that provides multiple lasers of different wavelengths can be used.

The foregoing discussion of the disclosed systems and methods has been presented for purposes of illustration and description. Further, the description is not intended to limit the systems and methods to the form disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use of the invention. It is intended that the appended claims be construed to include alternative embodiments to the extent permitted by the prior art.

What is claimed is:

1. A method of mitigating backscatter noise in a Lidar system, the method comprising:
    transmitting a first set of one or more pulses of a first wavelength from a laser emitter toward a target;
    transmitting a second set of one or more pulses of a second wavelength from the laser emitter toward the target;
    estimating, based on a first estimated distance of the target, a first time range for the first set of one or more pulses of the first wavelength to be received;
    separating, with a first wavelength filter switch, received light into light of the first wavelength and light of the second wavelength;

during the first time range, generating a second estimated distance of the target based on the separated received light of the first wavelength; and using the second estimated distance of the target to update the first estimated distance of the target.

2. The method of claim 1, wherein the first and second sets of one or more pulses are transmitted from the laser emitter through a second wavelength filter switch.

3. The method of claim 1, wherein the first and second sets of one or more pulses are transmitted for a first and second period of time, respectively, based on the first estimated distance of the target.

4. The method of claim 1, wherein separating the received light comprises:

separating a backscattered signal of a third wavelength, wherein the third wavelength differs from the first wavelength; and filtering out the backscattered signal.

5. The method of claim 4 wherein the third wavelength is the same as or similar to the second wavelength.

6. The method of claim 1, wherein the first wavelength filter switch is a dichroic filter switch.

7. The method of claim 1, wherein the first wavelength filter switch comprises a spectral-spatial filter.

8. The method of claim 1, further comprising using the second estimated distance of the target to update a frequency of which pulses of the first wavelength and pulses of the second wavelength are transmitted toward the target.

9. The method of claim 1, further comprising:

estimating, based on the first estimated distance of the target, a second time range for the second set of one or more pulses of the second wavelength to be received;

during the second time range, generating a third estimated distance of the target based on the separated received light of the second wavelength; and using the third estimated distance of the target to update the first estimated distance of the target.

10. A Lidar system, comprising:

a laser emitter transmitting a first set of one or more pulses of a first wavelength and a second set of one or more pulses of a second wavelength toward a target;

a processor estimating, based on a first estimated distance of the target, a first time range for the first set of one or more pulses of the first wavelength to be received;

a variable waveplate or other filter receiving light;

a first wavelength filter switch separating the received light into light of the first wavelength and light of the second wavelength; and the processor:

during the first time range, generating a second estimated distance of the target based on the separated received light of the first wavelength; and using the second estimated distance of the target to update the first estimated distance of the target.

11. The Lidar system of claim 10, wherein the first and second sets of one or more pulses are transmitted from the laser emitter through a second wavelength filter switch.

12. The Lidar system of claim 10, wherein the first and second sets of one or more pulses are transmitted for a first and second period of time, respectively, based on the first estimated distance of the target.

13. The Lidar system of claim 10, wherein separating the received light comprises:

separating a backscattered signal of a third wavelength, wherein the third wavelength differs from the first wavelength; and filtering out the backscattered signal.

14. The Lidar system of claim 13, wherein the third wavelength is the same as or similar to the second wavelength.

15. The Lidar system of claim 10, wherein the first wavelength filter switch is a dichroic filter switch.

16. The Lidar system of claim 10, wherein the first wavelength filter switch comprises a spectral-spatial filter switch.

17. A computing system, comprising:

a laser emitter transmitting a first set of one or more pulses of a first wavelength and a second set of one or more pulses of a second wavelength toward a target;

a processor estimating, based on a first estimated distance of the target, a first time range for the first set of one or more pulses of the first wavelength to be received;

a variable waveplate or other filter receiving light;

a first wavelength filter switch separating the received light into light of the first wavelength and light of the second wavelength; and the processor:

during the first time range, generating a second estimated distance of the target based on the separated received light of the first wavelength; and using the second estimated distance of the target to update the first estimated distance of the target.

18. The computing system of claim 17, wherein the first and second sets of one or more pulses are transmitted from the laser emitter through a second wavelength filter switch.

19. The computing system of claim 17, wherein the first and second sets of one or more pulses are transmitted for a first and second period of time, respectively, based on the first estimated distance of the target.

20. The computing system of claim 17, wherein separating the received light comprises:

separating a backscattered signal of a third wavelength, wherein the third wavelength differs from the first wavelength; and filtering out the backscattered signal.

21. The computing system of claim 20, wherein the third wavelength is the same as or similar to the second wavelength.

22. The computing system of claim 17, wherein the first wavelength filter switch is a dichroic filter switch.

* * * * *